United States Patent

Baek et al.

[11] Patent Number: 6,041,036
[45] Date of Patent: Mar. 21, 2000

[54] DUAL RECEIVE, DUAL TRANSMIT FAULT TOLERANT NETWORK ARRANGEMENT AND PACKET HANDLING METHOD

[75] Inventors: Young Sik Baek; Sang Man Lee; Hun Kang, all of Daejoen, Rep. of Korea

[73] Assignee: Electronics and Telecommunications Research Institute, Daejeon, Rep. of Korea

[21] Appl. No.: 08/990,047

[22] Filed: Dec. 12, 1997

[30] Foreign Application Priority Data

May 8, 1997 [KR] Rep. of Korea ................. 97-17716

[51] Int. Cl.[7] ................. H04J 1/16; H04J 3/14; H04L 1/00; H04L 12/26
[52] U.S. Cl. ................. 370/222; 370/228
[58] Field of Search ................. 370/221–228, 370/242–246; 340/825.01; 714/2, 3, 4

[56] References Cited

U.S. PATENT DOCUMENTS 5,680,389  10/1997  Douglas et al. ................. 370/228
5,848,055  12/1998  Fedyk et al. ................. 370/228
5,936,938   8/1999  Weldon et al. ................. 370/228
5,949,754   9/1999  Takahashi ................. 370/222

OTHER PUBLICATIONS

DRDT: Highly Survivable Network Architectures; Youngsik Baek, Sangman Lee, Hun Kang; Apr. 1997; pp. 999–1003.

*Primary Examiner*—Douglas W. Olms
*Assistant Examiner*—David R Vincent
*Attorney, Agent, or Firm*—Antonelli, Terry, Stout & Kraus, LLP

[57] ABSTRACT

A fault tolerant network using a dual cross path for real-time switching and packet handling method are disclosed. In DRDT-II, one of two packets received from two input ports is selected, the other is discarded, and two duplicated packets are transmitted through two output ports. That is, one link bypasses one node. In DRDT-III, the other link bypasses two nodes. Even when fault occurs in neighboring nodes at the same time, only these nodes are abandoned, and remaining nodes can be communicated with one another, improving the reliability of the network.

3 Claims, 7 Drawing Sheets

DUAL RECEIVE, DUAL TRANSMIT FAULT TOLERANT NETWORK ARRANGEMENT AND PACKET HANDLING METHOD

BACKGROUND OF THE INVENTION

1. Field of the Invention

The present invention relatest to a fault tolerant network arrangement using a dual cross path for real-time switching and packet handling method.

2. Discussion of Related Art

When a fault occurs in a communication network, a dual ring, or forward-direction and reverse-direction cross paths is conventionally used to enable communication to perform. However, with the dual ring, switching time becomes longer as the number of node composing the ring increases because the switching time depends on the number of node. Furthermore, time for detecting the fault is required. Moreover, in case of conventional forward-direction and reverse-direction cross paths, though there are many substitute paths for preparing occurrence of a fault, the algorithm is complicated. This does not allow the actual application.

FIG. 1 is a view showing an arrangement of a conventional dual fiber distributed data interface (referred to hereinafter as FDDI) network under a normal condition and FIG. 2 is a view showing an arrangement of the conventional dual FDDI network upon occurrence of a fault. The conventional dual FDDI network is constructed in such a manner that nodes 10, 20, 30 and 40 are connected to one another through a dual ring. Referring to FIG. 2, upon the occurrence of the fault at nodes 30 and 40 among nodes 10, 20, 30 and 40 connected through the dual network, the remaining nodes 10 and 20 are rearranged through a single network so that they can normally communicate with each other.

Namely, under the normal condition, the communications are performed in the opposite directions through the two lines as shown in FIG. 1. If the fault occurs at a certain node or link, the remaining nodes are rearranged through the single network as shown in FIG. 2. As a result, the normal nodes can communicate with each other. In this manner, the conventional dual FDDI network must first detect the fault to process it. With the fault detected, the remaining nodes are rearranged through the single line, for message transmission and reception. However, the above-mentioned conventional dual FDDI network with the dual line has disadvantages in that the fault detection must be carried out in real-time, and time required for the rearrangement depends on the number of nodes constituting the network.

FIG. 3 shows a structure of a conventional dual cross paths in DRDT network. Referring to FIG. 3, the packets of two DRDT interface units 50 and 60 pass through each link, and one packet reaches to the final destination in a manner that four packets are transmitted through four paths to the nodes. With this structure, the real-time fault detection is not required because the fault is detected according to the network structure, contrast to the aforementioned method in which the fault is first detected, and then processed.

Each node composing the ring in DRDT network is composed of two DRDT nodes (referred to hereinafter as D-node). If fault occurs in both of the two nodes simultaneously, an island is made in the interconnection network. However, if only one D-node fault at each ring node, DRDT performs normal operation. When the fault occurs at both upper-level D-node composing ring node (referred to hereinafter as D-node/U) and lower-level D-node composing ring node (D-node/L) simultaneously, it is mostly due to power failure or maintenance problem.

FIG. 3 shows how the packets are passing DRDT network for the given DRDT configuration. In this configuration, D-node/Us 71, 72, 73 and 74 locationally correspond to D-node/Ls 81, 82, 83 and 84. The packet transmitted from DRDT interface unit (DIFU) 50 is duplicated by a passive splitter to be passed to D-nodes 71 and 81. The packet stored in the queue of first DIFU 50 is duplicated and passed from first D-node/U 71 to second D-nodes 72 ad 82, and the D-node/L 81 passes the packet to second D-nodes 72 and 82 in the same way. The packet duplication is performed by a passive splitter as in DIFUs 50 and 60. Second D-node/U 72 and second D-node/L 82 choose one of the redundant received packets and pass the selected packet to the next stage through a passive splitter. In the fourth D-nodes 74 and 84, the fourth D-node/U 74 and fourth D-node/L 84 choose one of the duplicated packets respectively, recognize that it is the final node, and pass the packet to DIFU through the queue. DIFU finally chooses one of the received duplicated packets from fourth D-node/U 74 and fourth D-node/L 84.

As explained above, the packets are duplicated and selected link by link, which allows only a single same packet at each link, i.e. for a packet to arrive its final destination, four packets are passed from each D-node to D-node using four paths.

FIG. 4 is a conventional D-node block diagram, showing the structure of the D-node for DRDT network of FIG. 3.

Referring to FIG. 4, D-node is composed of two interface units, packet processing module (PHM) 93, fault detection handling module (FDHM) 94, and lookup table 95. FIG. 5 shows a conventional DIFU configuration. Referring to FIG. 5, DIFU is constructed in a manner that PHM 130, FDHM 140, lookup table 150 and processor 160 are connected. DIFU of FIG. 5 is used for connection to the host.

SUMMARY OF THE INVENTION

Accordingly, the present invention is directed to a fault tolerant network arrangement and packet handling method that substantially obviates one or more of the problems due to limitations and disadvantages of the related art.

An object of the present invention is to provide a fault tolerant network arrangement and effective packet control algorithm, which have reliability higher than that of the conventional one.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the fault tolerant network arrangement using a dual cross path, for real-time switching, includes multiple nodes constitutes a ring, each of which is composed of a upper-level dual receive/transmit node (D-node/U) and lower-level dual receive/transmit node (D-node/L), each of the nodes having two input ports and two output ports, in which one of the output ports of the nth D-node/U is coupled to one of the input ports of the (n+1)th D-node/U, the other output port of the nth D-node/U is coupled to one of the input ports of the (n+2)th D-node/L, one of the output ports of the nth D-node/L is coupled to one of the input ports of the (n+1) th D-node/L, and the other input port of the nth D-node/L is coupled to the other input port of the (n+1) th D-node/U, each of the nodes receiving two packets, selecting one of them, abandoning the other one, duplicating the selected one, and transmitting the duplicated packets through the two output ports.

According to another embodiment of the present invention, there is provided a fault tolerant network arrangement using a dual cross path for real-time switching, including multiple nodes constitutes a ring, each of which is composed of a upper-level dual receive/transmit node (D-node/U) and lower-level dual receive/transmit node (D-node/L), each of the nodes having two input ports and two output ports, in which one of the output ports of the nth D-node/U is coupled to one of the input ports of the (n+1)th D-node/U, the other output port of the nth D-node/U is coupled to one of the input ports of the (n+2)th D-node/L, one of the output ports of the nth D-node/L is coupled to one of the input ports of the (n+1)th D-node/L, and the other input port of the nth D-node/L is coupled to one of the input ports of the (n+3)th D-node/U, each of the nodes receiving two packets, selecting one of them, abandoning the other one, duplicating the selected one, and transmitting the duplicated packets through the two output ports.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
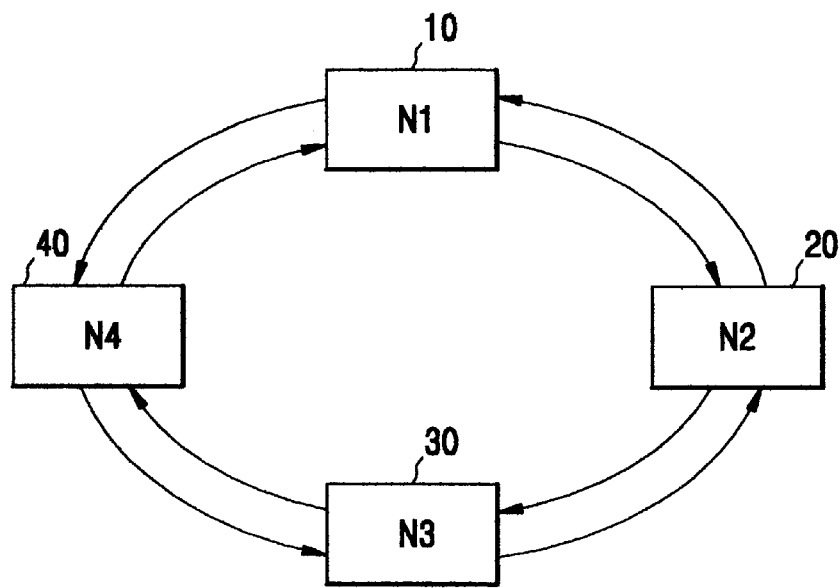
FIG. 1 is a view showing an arrangement of a conventional dual FDDI network under a normal condition.
Figure 2:
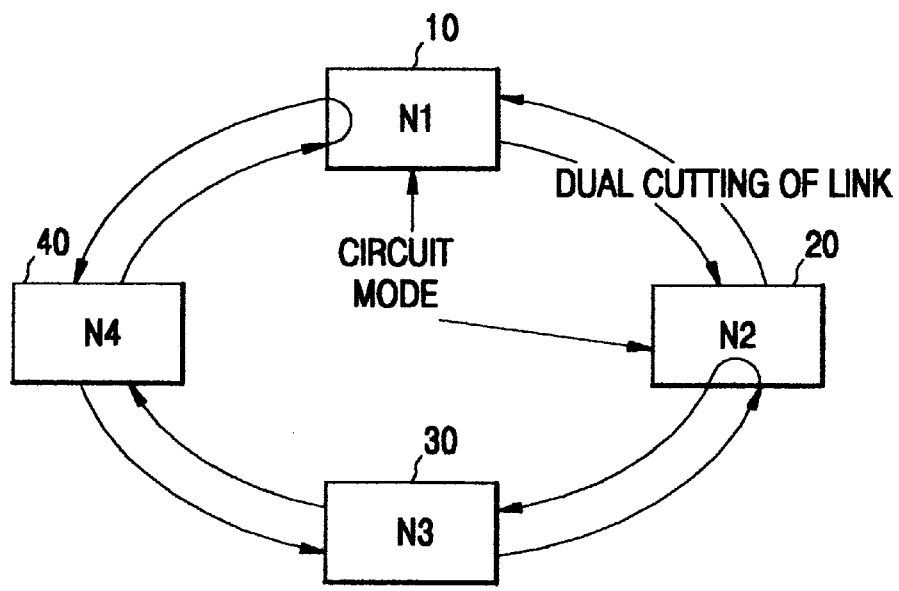
FIG. 2 is a view showing an arrangement of the conventional dual FDDI network upon occurrence of a fault.
Figure 3:
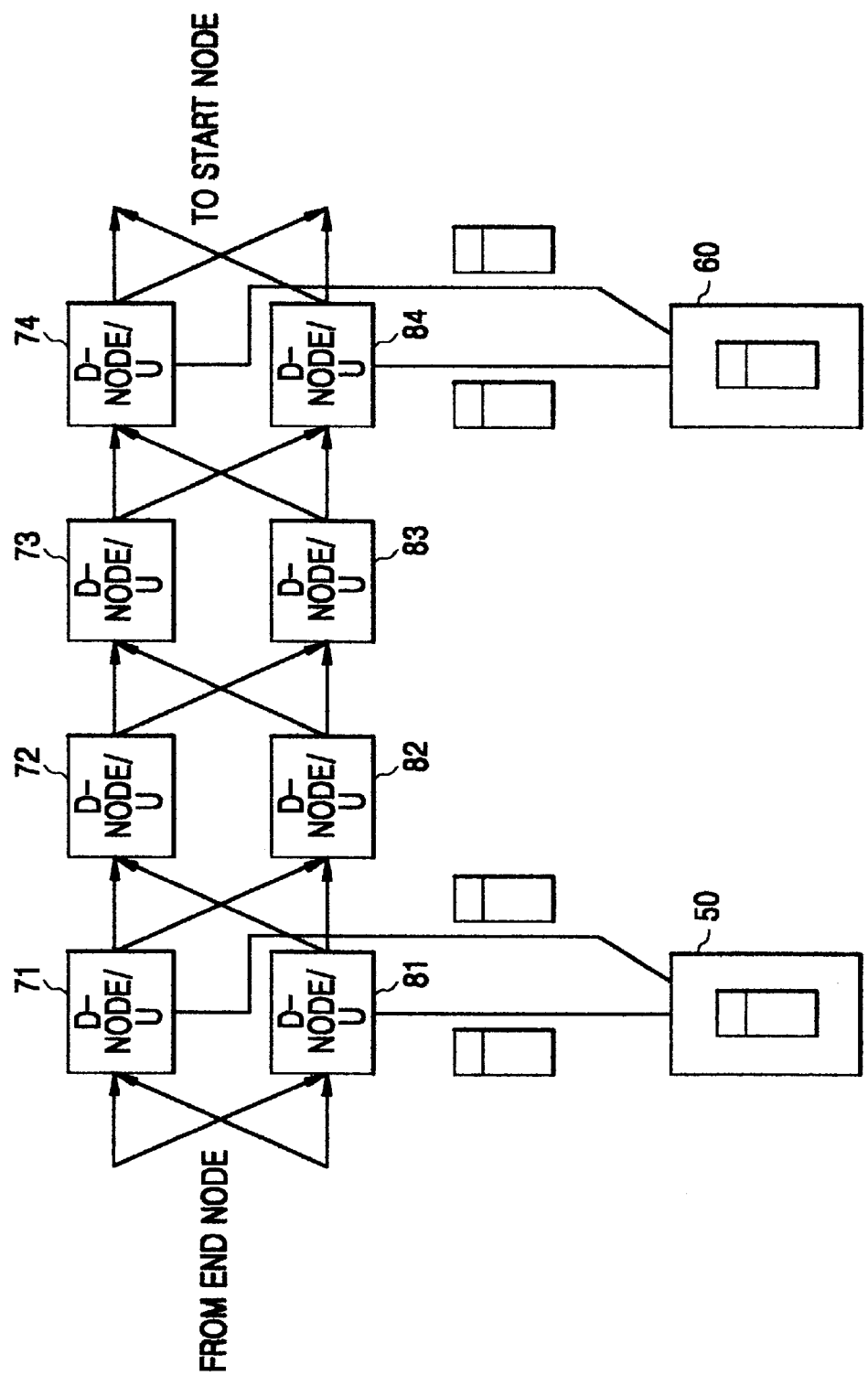
FIG. 3 shows a structure of a conventional dual cross paths in DRDT network.
Figure 4:
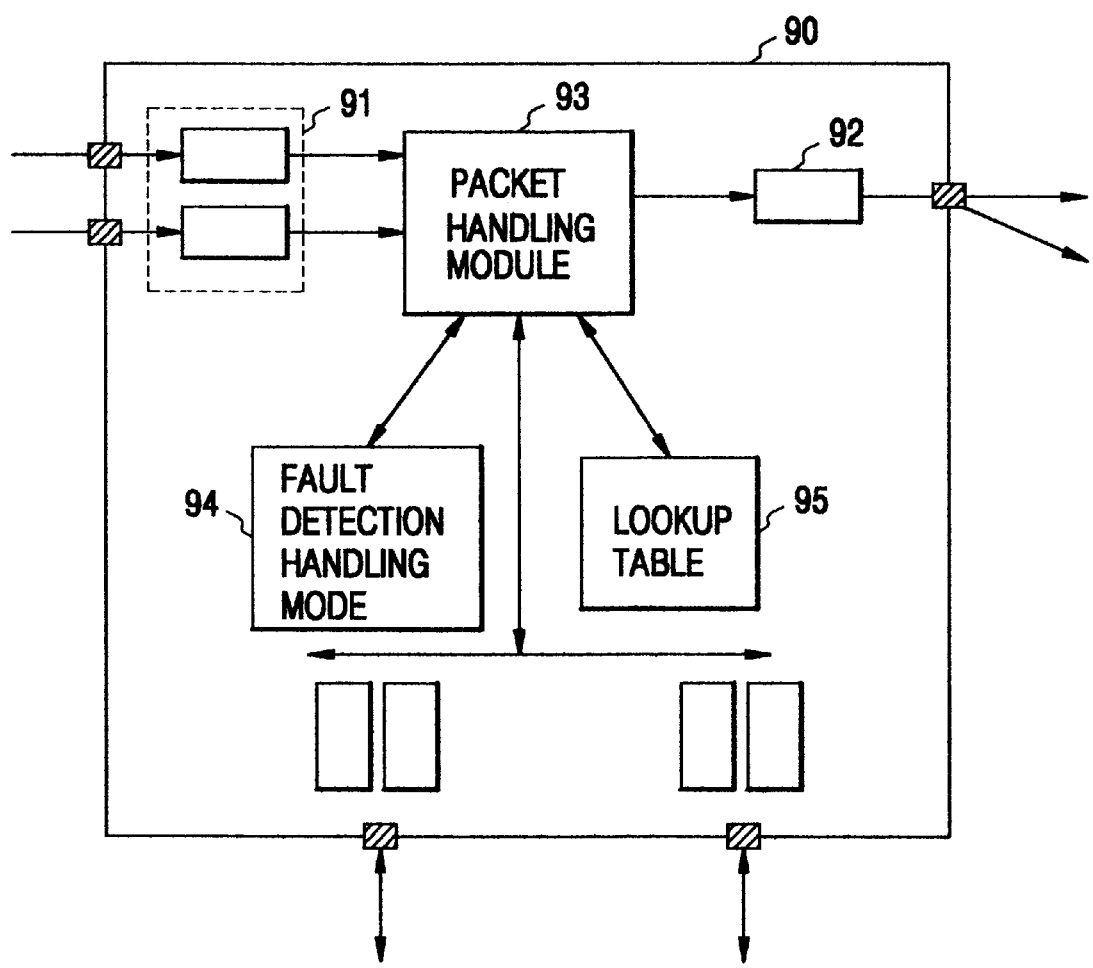
FIG. 4 is a conventional D-node block diagram, which shows the structure of the D-node for DRDT network of FIG. 3.
Figure 5:
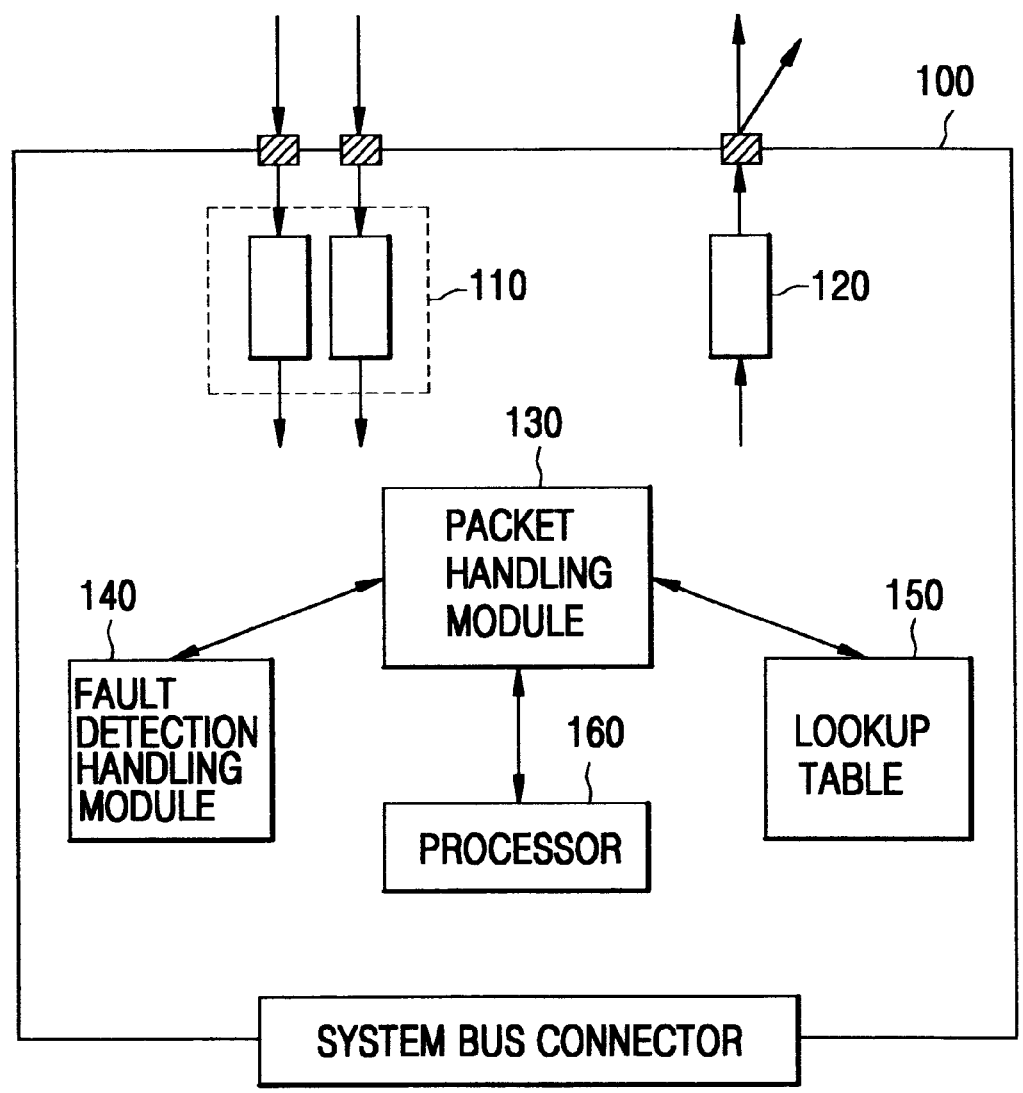
FIG. 5 shows a conventional DIFU configuration.
Figure 6:
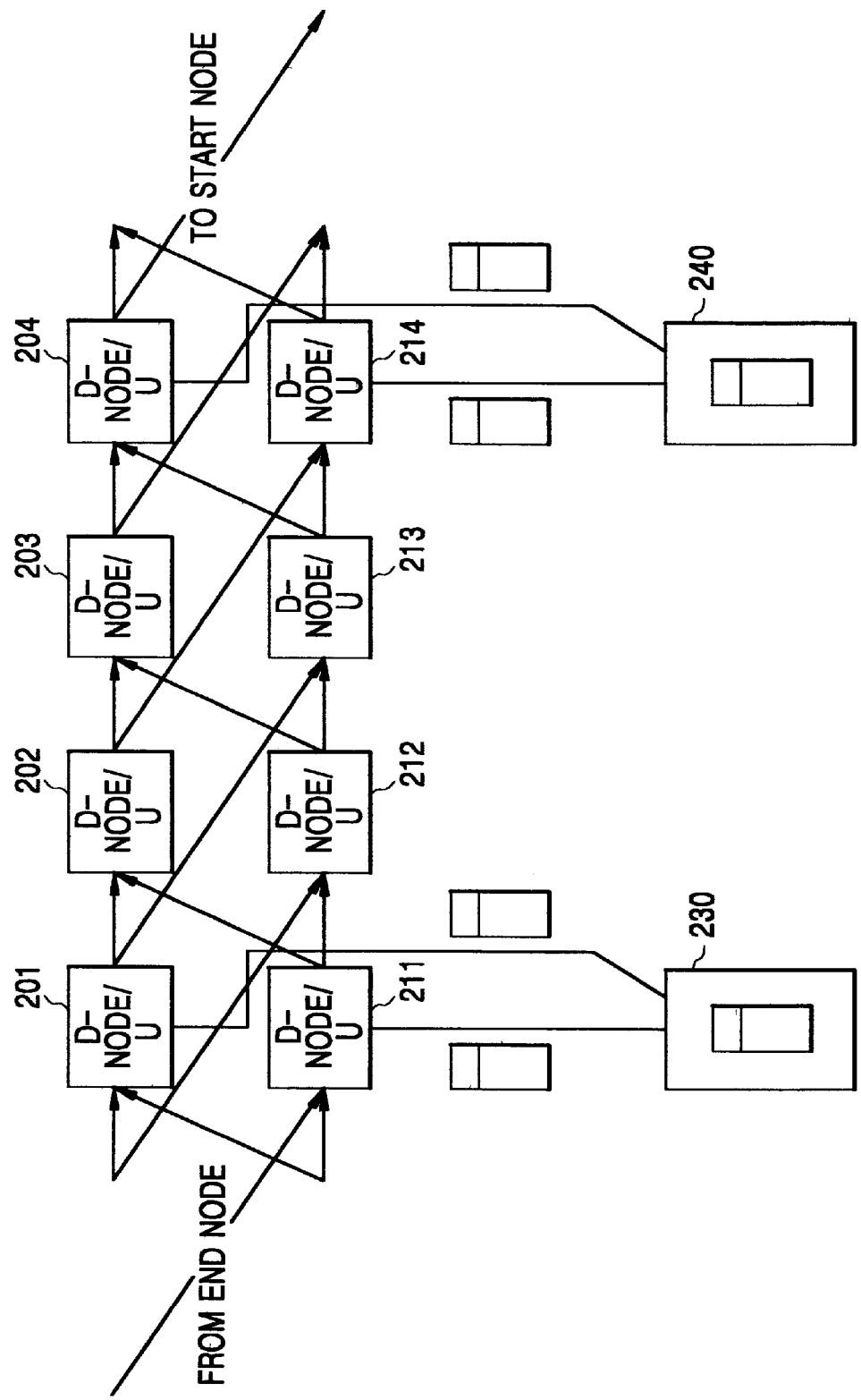
FIG. 6 is a view showing an arrangement of a DRDT-II fault tolerant network using a dual cross path according to the present invention.

FIG. 6 is a view showing an arrangement of a DRDT-II fault tolerant network using a dual cross path according to the present invention. Referring to FIG. 6, D-node constituting a ring is composed of a D-node/L 211, 212, 213 and 214 and D-node/U 201, 202, 203 and 204, each of which has two input ports and two output ports respectively. For example, one of the output ports of D-node/U 202 is coupled to one of the input ports of the next D-node/U 203, and the other output port of D-node/U 202 is coupled to one of the input ports of D-node/L 214 which follows D-node/L 213 locationally corresponding to D-node/U 203. Each of D-nodes receives two packets, selects one of them, removes the other one, duplicates the selected packet, and transmits the duplicated packets through the two output ports. In DRDT-II structure according to the present invention, one link bypasses one node, contrast to the conventional DRDT in which the connection of the D-nodes is made only between neighboring nodes.

The packet transmission process in DRDT-II of the present invention is identical to that in the conventional DRDT network. That is, each D-node selects one of the duplicated packets received through the two input ports, discards the other one, and transmits two packets which are identical to each other. With the conventional DRDT, the packet is discarded at the destination where the packet reaches because the packet is transmitted to only next stage. In case of DRDT-II structure of the present invention, a packet which passes the destination node exits because there is a link bypassing one node. This is also applied to DRDT-III structure which is explained below. That is, there is a packet which passes by the destination node in DRDT-II of the present invention, contrast to the conventional DRDT.

Figure 7:
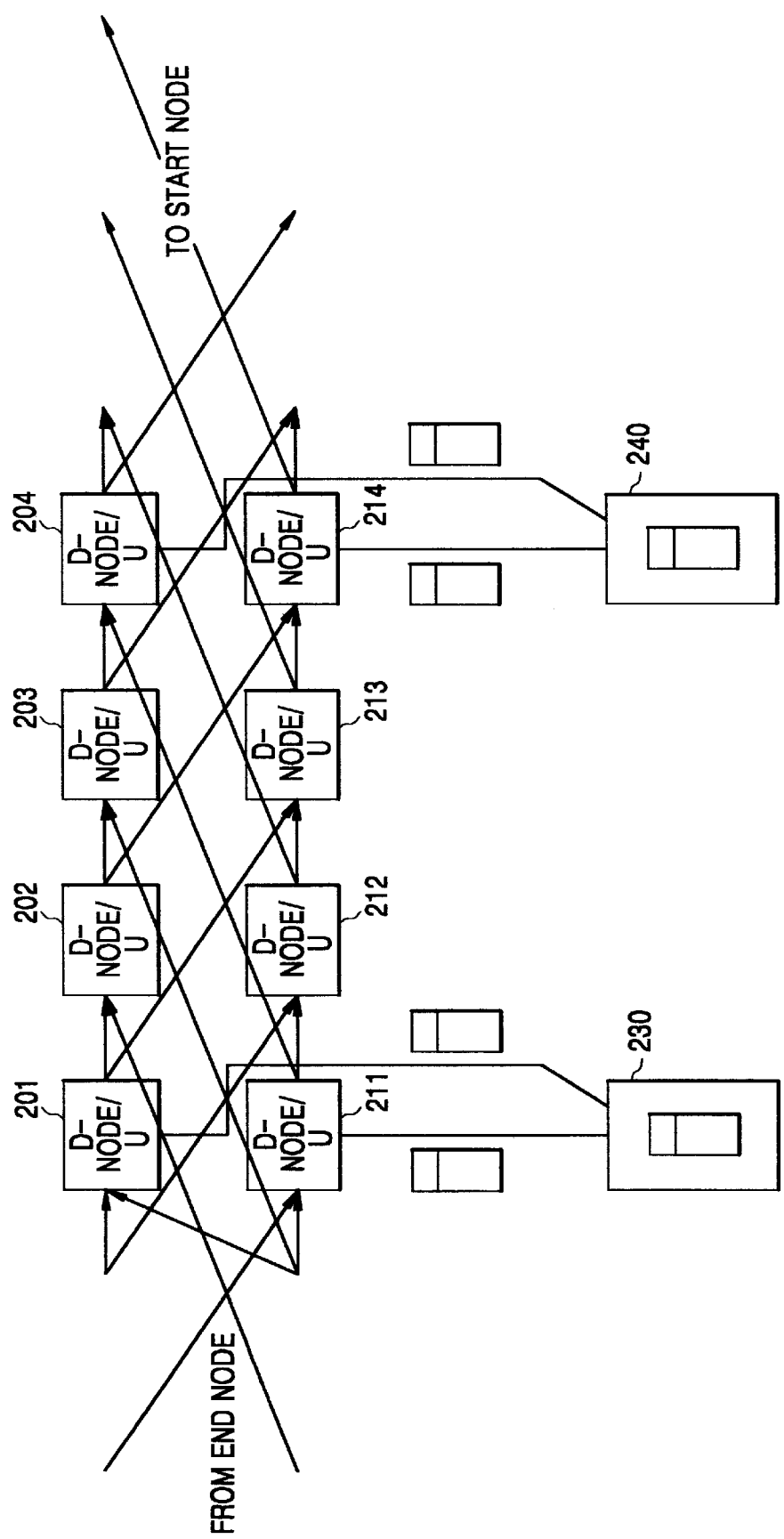
FIG. 7 is a view showing an arrangement of a DRDT-III fault tolerant network using a dual cross path according to the present invention.

FIG. 7 is a view showing an arrangement of improved DRDT-III fault tolerant network using a dual cross path according to the present invention. Referring to FIG. 7, the node constituting a ring is composed of D-node/L 211, 212, 213 and 214 and D-node/U 201, 202, 203 and 204, each of which has two input ports and two output ports respectively. One of the output ports of D-node/U 202 is coupled to one of the input ports of the next D-node/U 203, and the other output port is coupled to one of the input ports of D-node/L 214, bypassing one node. One of the output ports of D-node/L 211 is coupled to one of the input ports of the next D-node/L 212, and the other output port of D-node/L 211 is coupled to one of the input ports of D-node/U 204, bypassing two nodes. The packet transmission is carried out in a manner that each D-node receives two packets, selects one of them, discards the other one, duplicates the selected one, and transmits the duplicated packets through the two output ports.

Contrary to conventional DRDT, in DRDT-II, one link bypasses one node, and in DRDT-III, the other link bypasses two nodes. In the conventional DRDT, the packet can be discarded when it arrives at the destination because the link is connected to only next node. However, in case of DRDT-II and DRDT-III, the packet cannot be discarded at the destination because there is a link which passes by the destination node. Thus, an algorithm is required to process this. The packet transmission is performed in the same manner as that of the conventional DRDT.

FIGS. 6 and 7 show how the packets are passing DRDT-II and DRDT-III networks for the given DRDT configuration. Referring to FIG. 6, the packet transmitted from DIFU 230 is duplicated by a passive splitter to be passed to D-nodes 201 and 211. The packet stored in the queue of D-node 201 is duplicated and passed from D-node/U 201 to D-node/U 202 and D-node/U 213, and D-node/L 211 passes the packet to D-node/L 212 in the same manner. The packet duplication is performed by a passive splitter as in DIFU 230. D-node/U 202 and D-node/L 212 choose one of the redundant received packets and pass the selected packet to the next stage through a passive splitter. D-nodes 203 and 213 receive the duplicated packets which bypass one node, and operate in the same manner as in D-nodes 202 and 212.

D-node/U 204 and D-node/L 214 choose one of the duplicated packets respectively, recognize that it is the final node, and pass the packet to DIFU 240 through the queue. DIFU 240 finally chooses one of the received duplicated packets from D-node/U 204 and D-node/L 214. Here, contrast to the conventional DRDT, there is a links bypassing D-nodes 204 and 214, thus, if the packet is not discarded, it continuously circulates the ring, disabling the actual operation. In DRDT-III, the packet is transmitted in the same manner.

Figure 8:
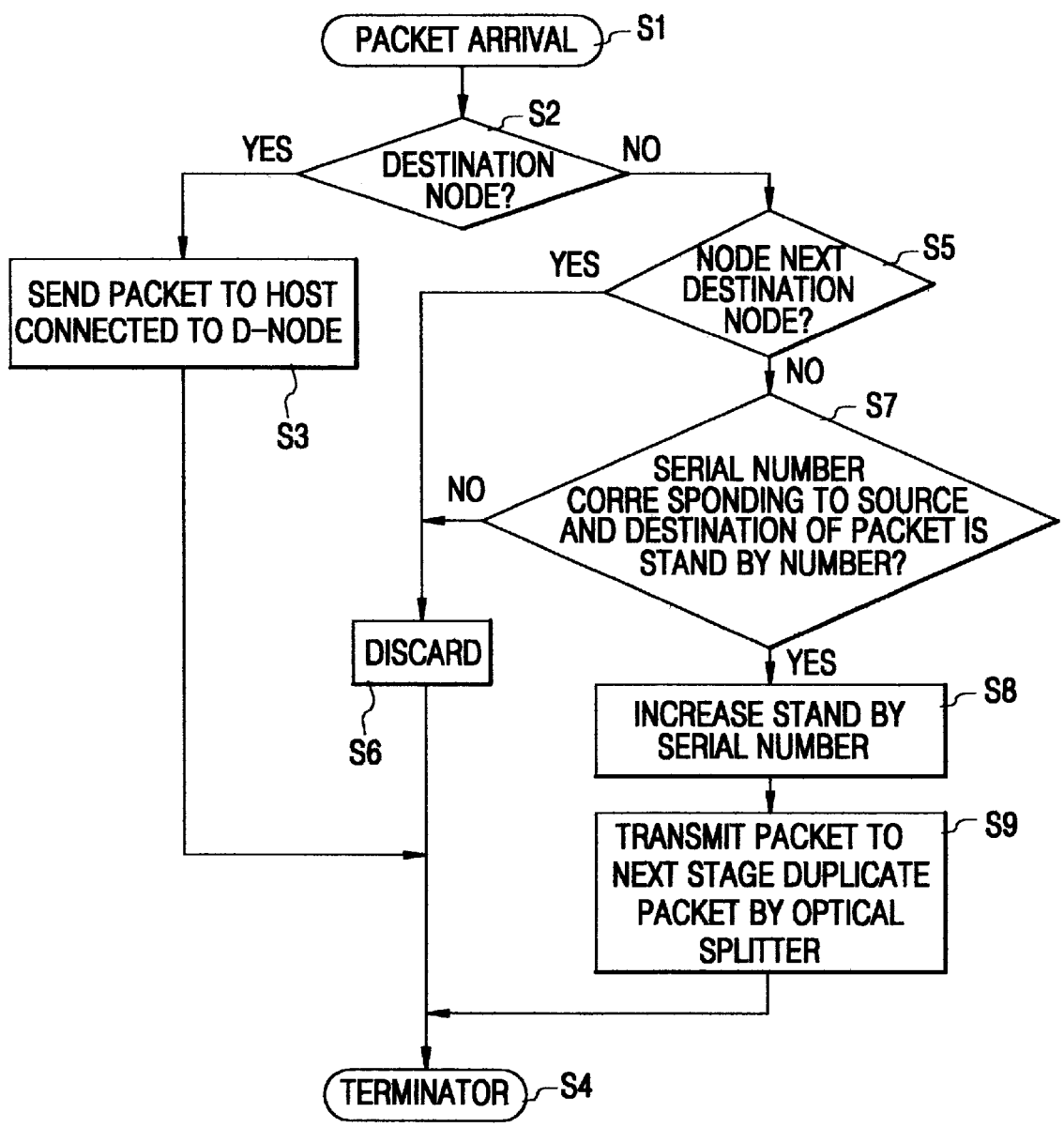
FIG. 8 is a flow diagram showing the packet control process according to the present invention.

FIG. 8 is a flow diagram of the packet deletion process according to the present invention, showing the packet discard algorithm applied to DRDT configurations of FIGS. 6 and 7. Referring to FIG. 8, when a packet arrives at a node (S1), it is judged that the node is the destination node of the packet (S2), and if it is, the packet is transmitted to the host connected to the node (S3), and to a terminator (S4). When the node is not the destination, it is judged that the node is the one which follows the destination node (S5), and if it is, the packet is discarded (S6) and the algorithm proceeds to terminator (S4). When the node is not the one which follows the destination node, it is judged that a serial number corresponding to the source and destination of the received packet is standby (S7). If it is not the standby number, the packet is discarded (S6) and the algorithm proceeds to the terminator (S4), and if it is the standby number, the serial number is increased (S8) and the packet is transmitted to the next stage. Here, the packet is duplicated, for example, by an optical splitter (S9) and transmitted to the terminator (S4).

As described above, DRDT-II and DRDT-III according to the present invention have the reliability and average transmission speed between the nodes, higher than those of the conventional DRDT. Furthermore, in case of DRDT-II, even when error occurs at three neighboring nodes at the same time, only these nodes are discarded in the entire network, and remaining nodes can communicated with one another, resulting in the improvement in the reliability of the network. With DRDT-III, communications can be performed even in case of five neighboring nodes having fault. Accordingly, in terms of the reliability, DRDT-III is the most excellent.

It will be apparent to those skilled in the art that various modifications and variations can be made in the fault tolerant network arrangement and packet handling method of the present invention without departing from the spirit or scope of the invention. Thus, it is intended that the present invention cover the modifications and variations of this invention provided they come within the scope of the appended claims and their equivalents.

What is claimed is:

1. A fault tolerant network arrangement using a dual cross path, for real-time switching, comprising:

multiple nodes constitutes a ring, each of which is composed of a upper-level dual receive/transmit node (D-node/U) and lower-level dual receive/transmit node (D-node/L), each of the nodes having two input ports and two output ports, wherein one of the output ports of the nth D-node/U is coupled to one of the input ports of the (n+1)th D-node/U, the other output port of the nth D-node/U is coupled to one of the input ports of the (n+2)th D-node/L, one of the output ports of the nth D-node/L is coupled to one of the input ports of the (n+1)th D-node/L, and the other input port of the nth D-node/L is coupled to the other input port of the (n+1)th D-node/U, each of the nodes receiving two packets, selecting one of them, abandoning the other one, duplicating the selected one, and transmitting the duplicated packets through the two output ports.

2. A fault tolerant network arrangement using a dual cross path for real-time switching, comprising:

multiple nodes constitutes a ring, each of which is composed of a upper-level dual receive/transmit node (D-node/U) and lower-level dual receive/transmit node (D-node/L), each of the nodes having two input ports and two output ports, wherein one of the output ports of the nth D-node/U is coupled to one of the input ports of the (n+1)th D-node/U, the other output port of the nth D-node/U is coupled to one of the input ports of the (n+2)th D-node/L, one of the output ports of the nth D-node/L is coupled to one of the input ports of the (n+1)th D-node/L, and the other input port of the nth D-node/L is coupled to one of the input ports of the (n+3)th D-node/U, each of the nodes receiving two packets, selecting one of them, abandoning the other one, duplicating the selected one, and transmitting the duplicated packets through the two output ports.

3. A packet handling method using a fault tolerant network arrangement in which each of D-node/U and D-node/L selects one of packets received from a dual receive/transmit interface unit, discards the other one, duplicates the selected packet, and transmits the duplicated packets through its two output ports, the method comprising the steps of:

checking a packet arriving at a node, and if the node is the destination of the packet, transmitting the packet to a host;

checking the node is the one which follows the destination node when the node is not the destination of the packet, and if it is, discarding the packet;

transmitting two duplicated packets to the next stage through the output ports when the node is not the one which follows the destination node; and increasing a serial number corresponding to the source and destination of the packet.

* * * * *